United States Patent [19]
Lin et al.

[11] Patent Number: 5,378,448
[45] Date of Patent: Jan. 3, 1995

[54] PROCESS FOR REMOVING SELENIUM FROM SULFUR

[76] Inventors: Hsing K. Lin, 2143 Bridgewater Dr., Fairbanks, Ak. 99709-4104; Pemmasani D. Rao, 1005 N. Coppet St., Fairbanks, Ala. 99709-4178

[21] Appl. No.: 255,170

[22] Filed: Jun. 7, 1994

[51] Int. Cl.⁶ .................. C01B 17/02; C01B 19/00
[52] U.S. Cl. .................. 423/508; 423/511; 423/567.1; 423/578.1; 423/578.4; 423/658.5
[58] Field of Search ............ 423/508, 509, 510, 511, 423/567.1, 578.1, 578.2, 578.4, 658.5

[56] References Cited

U.S. PATENT DOCUMENTS

| | | | |
|---|---|---|---|
| 3,661,535 | 5/1972 | Somerville | 23/306 |
| 4,259,511 | 3/1981 | Scholl | 560/25 |
| 4,663,141 | 5/1987 | Sonoda et al. | 423/510 |

FOREIGN PATENT DOCUMENTS

| | | | |
|---|---|---|---|
| 1066875 | 11/1979 | Canada | 423/578.1 |
| 55-158112 | 12/1980 | Japan | 423/510 |
| 57-179004 | 11/1982 | Japan | 423/567.1 |

Primary Examiner—Gary P. Straub
Assistant Examiner—Timothy C. Vanoy
Attorney, Agent, or Firm—R. Russel Austin

[57] ABSTRACT

In a liquid-liquid leaching process for removing selenium from selenium-contaminated sulfur, the selenium-contaminated sulfur in dissolved in an organic solvent to form an organic solution including sulfur and selenium. Selenium in the organic solution is preferentially oxidized to form one or more hydrophilic compounds of selenium. The hydrophilic compounds of selenium are transferred into an aqueous solution by liquid-liquid leaching, thereby removing selenium contaminant from the organic solution and leaving purified sulfur therein. The organic solution is then separated from the aqueous solution for recovering the purified sulfur.

19 Claims, 1 Drawing Sheet

PROCESS FOR REMOVING SELENIUM FROM SULFUR

BACKGROUND OF THE INVENTION

The present invention relates generally to methods of removing selenium (Se) from sulfur (S) recovered from leaching of residues of sulfide concentrates. It relates in particular to a liquid-liquid extraction process wherein selenium is transferred from an organic solution of selenium-contaminated sulfur into an aqueous solution which is subsequently separated from the organic solution.

Selenium content in sulfur recovered from leaching of residues of sulfide concentrates is usually too high for the sulfur to be marketable. To a lesser extent, the recovered sulfur may contain tellurium in quantities too high for the sulfur to be marketable.

Selenium and sulfur have very similar chemical properties, and atoms in selenium and sulfur molecules can substitute for each other. Binary compounds of selenium with sulfur have been known for more than one-hundred years. During the last two decades, it has been shown that selenium and sulfur can form diatomic molecules, chains of various lengths ($Se_xS_y$), or rings of various sizes ($Se_mS_n$ where $m+n=6, 7, 8$ or $12$) (E. Fluck, *Gmelin Handbuch Der Anorganischen Chemie*, Vol B2, Springer-Verlag, Berlin, 1984, pp. 280–315). Because of this, separation of selenium and sulfur, especially purification of sulfur which contains only a minor amount of selenium, can be difficult and expensive.

Selenium and sulfur have different boiling points, 445 and 685 degrees Centigrade (° C.) respectively. While the difference in the boiling points is significant, in mixtures of molten selenium and sulfur, volatility of selenium is higher, and volatility of sulfur is lower than predicted by Raoult's law. This creates difficulty in separation by distillation. In addition, diatomic Se—S compounds have been found in gaseous phases evaporating from molten mixtures of selenium and sulfur at relatively high temperatures (E. Fluck, *Gmelin Handbuch Der Anorganischen Chemie*, Vol B2, Springer-Verlag, Berlin, 1984, pp. 280–315). This creates further difficulty in separation by distillation. However, as strength of S—Se bonding decreases with increasing temperature, separation of selenium and sulfur by distillation is still possible using tall distillation columns with a large number of distillation plates at relatively high temperature. It has been reported that, at Port Colborne Nickel Refinery, a twenty-seven meter (27 m) tall distillation column having 60 distillation plates was used to evaporate sulfur from anode slimes resulting from electrolysis of nickel matte (D. M. Chizhikov and V. P. Shchastlivyi, *Selenium and Selenides*, Collet's Ltd., London, 1968, pp. 104–107). The selenium in the sulfur was reduced from an initial 0.15 percent (%) by weight to five parts per million (5 ppm), with the evaporation conducted at 500° C.

Chemical additives have been used to enhance separation of selenium from sulfur. Kuwano, in Japanese Patent 6,921,407, discloses an applied zone refining technique with additions of silver sulfide ($Ag_2S$) to separate selenium impurity from sulfur containing 200 ppm selenium. After a consolidation rate of two centimeters per second (2 cm/s) through a continuous zone refining furnace for fifty passes, 10, 40, 60 and 70% of selenium was removed with additions of 5, 10, 20 and 40% of $Ag_2S$ respectively. In the aforementioned Japanese Patent, Kuwano also discloses evaporation of sulfur with addition of copper (Cu) to form copper selenide (CuSe), thereby lowering partial pressure of selenium in the gaseous phase. Distillation separation of selenium from sulfur using addition of silver (Ag) has been reported (H, Suzuki et al. *Bulletin of the Chemical Society of Japan*, Vol. 47 (R74), No. 3, pp. 757–758). Mixing Ag powder with sulfur containing 130 ppm of selenium, the evaporation was conducted at 600°–700° C. Distilled sulfur samples contained 117 ppm without addition of Ag, and 2.5 ppm of selenium with addition of 0.86 grams (g) of Ag per 1.0 g of sulfur.

In Japanese Patent 7,134,490, Nakane discloses removal of selenium from molten sulfur by chlorination of the sulfur with chlorine ($Cl_2$) or sulfur chloride ($S_2Cl_2$). Selenium present in the molten sulfur was converted to chlorides and then carried away by blowing air through the melt for about one-hour. Any chlorides remaining in the melt were removed by activated carbon, alumina ($Al_2O_3$) or acid clay. The method was effective in removing about 50% of selenium impurity. Removal of 85% of selenium impurity by treating molten sulfur with magnesium chloride ($MgCl_2$) and nitric acid ($HNO_3$) has also been reported (M. N. slepanov et al., *Journals of Chemical Industry* (U.S.S.R), Vol. 18 (1941), No. 20, pp. 4–7).

Those skilled in the art to which the present invention pertains will recognize that while all of the above describes processes for removing selenium from sulfur have been successful to some degree, all involve one or more of large complex apparatus, high energy consumption, and a requirement for containing toxic or potentially toxic gasses. Clearly there is a need for a simpler more energy efficient process for removing selenium from sulfur.

SUMMARY OF THE INVENTION

It is an object of the present invention to provide a simple, energy efficient process for removing selenium from selenium-contaminated sulfur. This and other objects of the present invention are accomplished by a process wherein the selenium-contaminated sulfur is first dissolved in an organic solvent to form a first organic solution including sulfur and selenium. Selenium in the first organic solution is preferentially oxidized to form a reaction product therein including at least one hydrophilic compound of selenium.

The reaction product is transferred into a first aqueous solution by liquid-liquid leaching or extraction, thereby forming a second organic solution including the organic solvent and purified sulfur, and a second aqueous solution including the reaction product. The second organic solution is separated from the second aqueous solution for recovering the purified sulfur. The purified sulfur may be recovered by evaporating the organic solvent from the second organic solution. Organic solvent vapor from the evaporation process may, in turn, be condensed and thus returned to a liquid form, free of sulfur, and useable in subsequent process cycles.

In a preferred embodiment of the present invention, the first aqueous solution is an acid solution having a solution potential greater than about 0.90 Volts, preferably about 1.2 Volts. Solution potential of the first aqueous solution may be adjusted (increased) by adding sodium hypochlorite thereto. Oxidation of the selenium in the first organic solution is accomplished by agitating a combination of the first organic solution and the first aqueous solution to form a suspension of one in the other. Oxidation may be accomplished at a temperature for the combination as low as 5° C. The liquid-liquid leaching is accomplished by continuing the agitation of the first aqueous and organic solutions for a predetermined time period until most of the selenium from the contaminated sulfur is transferred to form the second aqueous solution.

A process in accordance with the present invention has been effective in removing more than 98% of selenium from selenium contaminated sulfur in about thirty minutes, providing purified sulfur containing less than about 5.0 ppm selenium.

No observable change of the chemical composition of the organic solvent occurs as a result of the oxidation step of the present invention. Because of this, as noted above, organic solvents are recoverable for re-use in subsequent purification cycles. As only a relatively low temperature is required for reacting the selenium in the first organic solution, and only a relatively low temperature is required for evaporating organic solvent from the second organic solution to yield solid purified sulfur, the process of the present invention is substantially more energy efficient than above-discussed prior art processes.

BRIEF DESCRIPTION OF THE DRAWINGS

The accompanying drawing, which is incorporated in and constitute a part of the specification, schematically illustrates a preferred embodiment of the invention and, together with the general description given above and the detailed description of the preferred embodiment given below, serves to explain the principles of the invention.

DETAILED DESCRIPTION OF THE INVENTION

Figure 1:
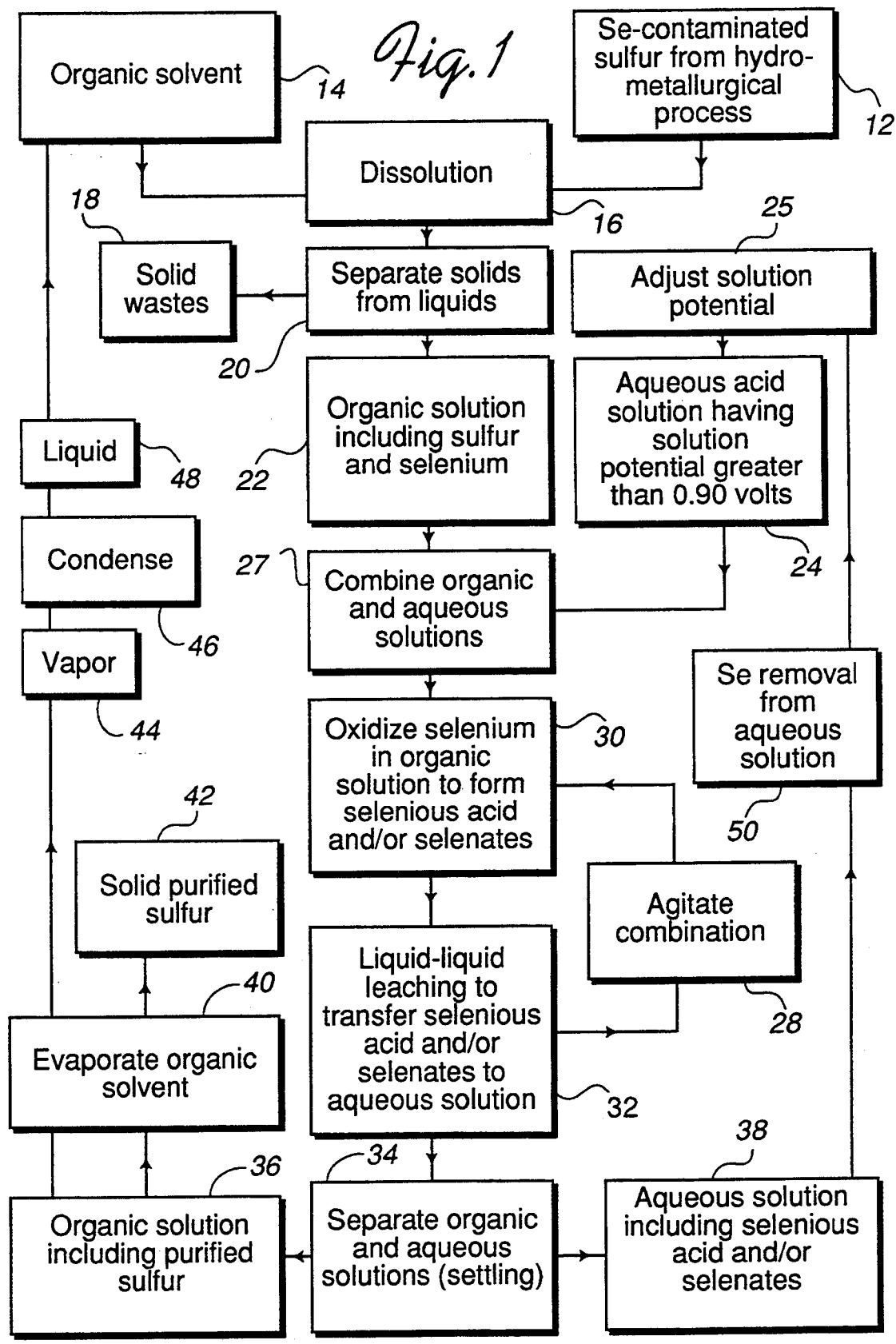
FIG. 1 is a flow chart schematically illustrating one preferred embodiment of a process in accordance with the present invention.

In the process for removing selenium from selenium-contaminated sulfur in accordance with the present invention, the selenium-contaminated sulfur in dissolved in an organic solvent, to form an organic solution including sulfur and selenium. Selenium in this organic solution is preferentially oxidized to form one or more hydrophilic compounds of selenium. The hydrophilic compounds of selenium are transferred into an aqueous solution by liquid-liquid leaching, thereby removing selenium contaminant from the organic solution and leaving purified sulfur therein. The organic solution is then separated from the aqueous solution for recovering the purified sulfur.

The organic solvent used to dissolve the sulfur contaminated selenium is preferably a water immiscible solvent. This allows the organic and aqueous solutions to be separated by settling after the hydrophilic compounds are transferred to the aqueous solution. In a preferred embodiment of the preferred invention, an aqueous acid solution is used for oxidizing selenium in the organic solution, and the same solution is used for the liquid-liquid leaching process. A particular advantage of this embodiment is that selective oxidation (in preference to sulfur) of selenium in the organic solution can be accomplished by suitably adjusting the solution potential of the aqueous solution, for example, by addition of an oxidant.

After an extensive experimental effort, it was determined that if the aqueous solution was acidic and the solution potential of the acidic solution had a sufficiently high positive value, oxidation of selenium in the organic solution by the aqueous solution could be significant, while oxidation of sulfur was negligible. It was also determined that oxidation of selenium in a water-immiscible organic solution by the aqueous solution could be readily accomplished by agitating the organic and aqueous solutions to form a suspension of one in the other. Continuing the agitation for a predetermined time period accomplished the required liquid-liquid leaching. Those familiar with the art to which the present invention pertains will recognize, of course, that in such an agitation, oxidation and leaching will occur simultaneously to some degree, oxidation dominating at the beginning of agitation and leaching dominating at the end of the predetermined agitation time period. Referring now to FIG. 1, a detailed description of a sulfur purification process in accordance with the above summarized preferred embodiment is set forth.

Selenium-contaminated sulfur from hydro-metallurgical operations (box 12) is dissolved in an organic solvent (boxes 14 and 16). Sulfur from such operations often contains more than 300 ppm of selenium. The organic solvent is preferably a water immiscible solvent. A suitable solvent may be formed from one or more water immiscible organic solvents selected from the group consisting of xylenes, tetrachloro-ethylene and carbon disulfide. Sulfur from hydro-metallurgical operations may contain insoluble solid wastes (box 18) in addition to selenium. These are preferably separated from the solution, for example by settling or filtering (box 20). The filtered or separated organic solution contains selenium and sulfur in solution (box 22). A preferred dissolution ratio for the contaminated sulfur is between about 10 and 400 gm (g) sulfur to 1.0 liter (l) of organic solvent. Those familiar with the art to which the present invention pertains will recognize that selection of the dissolution ration will be dependent to a certain extent on the organic solvent which is selected for use in the process.

An aqueous solution including an acid is prepared (box 24). A preferred aqueous acid solution preferably includes hydrochloric acid (HCl) in a concentration between about has a 0.5 and 1.5 Mole/liter (0.5–1.5M), and preferably has an HCl concentration of about 1.0M. As discussed above, it is important that this solution have a positive solution potential greater than about 0.90 Volts. Preferably the solution potential is greater than 0.96 Volts, and more preferably about 1.2 Volts. It is believed, without being limited to a particular value, that too high a solution potential greater may cause some decomposition of the organic solution. It is thus preferable that solution potential not exceed 1.35 Volts. If necessary, solution potential of the aqueous acid solution may be adjusted (box 25) by adding a suitable oxidant to the aqueous acid solution. In a hydrochloric acid solution, sodium hypochlorite is a preferred oxidant. Solution potentials here and throughout this specification and appended claims are potentials referenced to a standard hydrogen electrode (vs SHE).

The organic solution including selenium and sulfur, and the aqueous acid solution are combined (box 27), preferably in a ratio between about 5:1 and 1:5. One suitable ratio is about 1:1. The solutions may be combined in any reaction vessel. It is important that the reaction vessel be equipped with means for agitating the combination, for example a motor driven paddle. Agitating the combination of organic and aqueous solutions forms a suspension of one in the other, greatly increasing surface contact between what may be described as aqueous and organic phases of the combination.

The combination is agitated (box 28). While agitating the combination of the organic and aqueous solutions (box 30), selenium in the organic solution reacts with the aqueous solution to form a reaction product including at least one of selenious acid and selenate radicals (selenates), all of which are hydrophilic. While continuing the agitation of the combination of organic and aqueous solutions, these hydrophilic selenium compounds are transferred by liquid-liquid leaching from the organic solution to the aqueous solution (box 32). The combination is preferably maintained at a temperature between about 5° C. and 50° C. A temperature of about 25° C. has been found particularly suitable. After a certain time period, the original combination of organic and aqueous solutions is transformed by the reaction and liquid-liquid leaching into a new combination of an organic solution including purified sulfur (for example, containing less than about 5 ppm selenium) and an aqueous solution including selenious acid and/or selenates. It has been found that transformation may be completed in a time period as short as thirty minutes. The time period generally is shorter the higher the temperature of the combination during agitation, and the higher the solution potential of the aqueous solution.

After completion of the transformation, the aqueous and organic solutions are allowed to settle (box 34) and the organic solution including purified sulfur, and the aqueous solution including selenious acid and/or selenates are separated (boxes 36 and 38). The solvent is then evaporated from the organic solution including the purified sulfur (box 40), thus converting the organic solution from a liquid (phase) to a vapor (phase) (box 44), and leaving a residue of solid sulfur (box 42).

The organic solvent vapor is then condensed (box 46) and thus returned to liquid form (box 48). As discussed above, it has been determined that organic solvents used in this process are unchanged by the reaction and liquid-leaching operations. Accordingly, condensed solvent may be returned for re-use in subsequent process cycles. Selenium may be separated from the second aqueous solution as one or more insoluble compounds thereof by precipitation (box 50) and resulting selenium free acid solution may be used in subsequent process cycles after first restoring solution potential to the desired value (box 26).

Set forth below in tables 1, 2, and 3 are examples which indicate how time and effectiveness of the process of the present invention depend on factors such as solvent selection, and solution potential of the aqueous solutions. Those familiar with the art to which the present invention pertains that time and effectiveness of the above described process will also depend to a certain extent on the mode of agitation of the combination of solutions.

In all examples, aqueous and organic solutions were mixed in a 1:1 ratio, sulfur content of the initial organic solution was 20.0 g/l, and reaction temperature was maintained at 25° C. The aqueous solution in all cases was a 1M solution of HCL, the solution potential of which was adjusted by addition of sodium hypochlorite. In all cases weight loss of sulfur was less than 1%, indicating the extremely selective nature of the oxidation reaction.

It can be seen from Tables 1, 2, and 3 that selection of water immiscible organic solvent is relatively unimportant compared with selection of solution potential. It can also be seen that at a solution potential of about 1.20 Volts, a purification time of about 30 minutes is possible with any of the range of solvents tested.

TABLE 1

| Solvent | Reaction time. Hr | Solution potential V vs SHE | Weight loss of S sample. % | Se remaining in S. ppm | Se removal % |
| --- | --- | --- | --- | --- | --- |
| xylenes | 2.0 | 0.90 | <1 | 292 | 6 |
| xylenes | 2.0 | 1.05 | <1 | 104 | 66 |
| xylenes | 2.0 | 1.20 | <1 | <5 | >98 |

TABLE 2

| Solvent | Reaction time. Hr | Solution potential V vs SHE | Weight loss of S sample. % | Se remaining in S. ppm | Se removal % |
| --- | --- | --- | --- | --- | --- |
| xylenes | 2.0 | 1.20 | <1 | <5 | >98 |
| tetrachloro ethylene | 2.0 | 1.20 | <1 | <5 | >98 |
| carbon disulfide | 2.0 | 1.20 | <1 | <5 | >98 |

TABLE 3

| Solvent | Reaction time. Hr | Solution potential V vs SHE | Weight loss of S sample. % | Se remaining in S. ppm | Se removal % |
| --- | --- | --- | --- | --- | --- |
| xylenes | 0.5 | 1.20 | <1 | <5 | >98 |
| xylenes | 1.0 | 1.20 | <1 | <5 | >98 |
| xylenes | 2.0 | 1.20 | <1 | <5 | >98 |
| tetrachloro ethylene | 0.5 | 1.20 | <1 | <5 | >98 |
| carbon disulfide | 0.5 | 1.20 | <1 | <5 | >98 |

In summary, a hydro-metallurgical, liquid-liquid leaching process for removing selenium from selenium contaminated sulfur has been described. A processes in accordance with the present invention have been effective in removing more than 98% of selenium from selenium contaminated sulfur in about thirty minutes, providing purified sulfur containing less than about 5.0 ppm selenium from contaminated samples of sulfur containing over 300 ppm of selenium. The process is energy efficient requiring only relatively low temperatures for reaction and for recovery of sulfur. The process is efficient in materials use. In particular organic solvents and aqueous solutions used in the process are recoverable for use in repeated process cycles. Further, purification of contaminated sulfur may be accomplished with less than 1% loss of sulfur.

The present invention has been described in terms of a preferred embodiment. The invention is not limited however by the embodiments described. Rather, the invention is limited only by the claims appended hereto.

What is claimed is:

1. A process for removing selenium from selenium-contaminated sulfur, the process comprising the steps of:
   (a) dissolving the selenium-contaminated sulfur in an organic solvent to form a first organic solution including sulfur and selenium;
   (b) oxidizing selenium in said first organic solution to form a reaction product therein said reaction product including at least one hydrophilic compound of selenium;

(c) transferring said reaction product into a first aqueous solution by liquid-liquid leaching, thereby forming a second organic solution including said organic solvent and purified sulfur, and a second aqueous solution including said reaction product; and (d) separating said second organic solution from said second aqueous solution for recovering said purified sulfur.

2. The process of claim 1, wherein in step (b) said organic solvent is water immiscible and said selenium in said first organic solution is oxidized by agitating a combination of said first organic solution and said first aqueous solution to form a suspension of one in the other.

3. The process of claim 2, wherein said first aqueous solution is an acid solution having a solution potential greater than about 0.90 Volts.

4. The process of claim 3, wherein said first aqueous solution includes hydrochloric acid.

5. The process of claim 4, wherein said first aqueous solution further includes sodium hypochlorite.

6. The process of claim 5, wherein said solution potential is between about 0.9 and 1.35 Volts.

7. The process of claim 3 wherein said solution potential is between about 0.9 and 1.35 Volts.

8. The process of claim 1 further including the step of (e) evaporating said organic solvent from said second organic solution thereby converting said organic solvent from a liquid phase to a vapor phase and leaving a residue of purified sulfur.

9. The process of claim 8, further including the step of:

(f) condensing said vapor phase of said organic solvent to reconvert said organic solvent from said vapor phase into said liquid phase, thereby recovering sulfur-free organic solvent.

10. A process for removing selenium from selenium-contaminated sulfur, the process comprising the steps of:

(a) dissolving the selenium-contaminated sulfur in an organic solvent to form a first organic solution including sulfur and selenium;

(b) combining with said first organic solution a first aqueous solution including an acid, said aqueous solution having a positive solution potential;

(c) while agitating said combination of said first organic and aqueous solutions to form a suspension of one in the other, reacting said first organic solution with said first aqueous solution, thereby forming a reaction product in said first organic solution, said reaction product including at least one of selenious acid and selenates;

(d) while continuing said agitation of said combination of said first organic and aqueous solutions, transferring, by liquid-liquid leaching, said reaction product from said first organic solution to said first aqueous solution thereby forming a second organic solution including said organic solvent and purified sulfur, and a second aqueous solution containing said reaction product;

(e) separating said second aqueous solution from said second organic solution; and (f) evaporating said organic solvent from said second organic solution thereby converting said organic solvent from a liquid phase to a vapor phase and leaving a residue of purified sulfur.

11. The process of claim 10, further including the step of:

(g) condensing said vapor phase of said organic solvent to reconvert said organic solvent from said vapor phase into said liquid phase.

12. The process of claim 10, wherein in step (b) said predetermined solution potential is adjusted by adding sodium hypochlorite to said first aqueous solution.

13. The process of claim 10, wherein in step (b) said positive solution potential is greater than about 0.90 Volts.

14. The process of claim 13, wherein said solution potential is about 1.2 Volts.

15. The process of claim 10, wherein said organic solvent includes at least one water immiscible organic solvent selected from the group consisting of xylenes, tetrachloro-ethylene and carbon disulfide.

16. The process of claim 11, wherein said first aqueous solution contains about 0.5 to 1.5 Moles per liter of hydrochloric acid.

17. The process of claim 10, wherein said first organic solution contains about twenty grams of said selenium-contaminated sulfur per liter of said organic solvent.

18. The process of claim 10 wherein in step (c) said suspension is maintained at a temperature between about 5° C. and 50° C.

19. A process for removing selenium from selenium-contaminated sulfur, the process comprising the steps of:

(a) dissolving the selenium-contaminated sulfur in a water-immiscible organic solvent to form a first organic solution including sulfur and selenium, said organic solvent including at least one organic solvent selected from the group consisting of xylenes, tetrachloroethylene and carbon disulfide;

(b) combining with said first organic solution a first aqueous solution including hydrochloric acid and sodium hypochlorite, said aqueous solution having solution potential greater than about 0.90 Volts;

(c) while agitating said combination of said first organic and aqueous solutions to form a suspension of one in the other, reacting said first organic solution with said first aqueous solution, thereby forming a reaction product in said first organic solution, said reaction product including at least one of selenious acid and selenates;

(d) while continuing said agitation of said combination of said first organic and aqueous solutions, -transferring by liquid-liquid leaching said reaction product from said organic solution to said aqueous solution thereby forming a second organic solution including said organic solvent and purified sulfur, and a second aqueous solution containing said reaction product;

(e) separating said second aqueous solution from said second organic solution; and (f) evaporating said organic solvent from said second organic solution thereby converting said organic solvent from a liquid phase to a vapor phase and leaving a residue of solid, purified sulfur.

* * * * *